No. 827,926. PATENTED AUG. 7, 1906.
A. G. LAVERTINE & J. E. McNELLAN.
MEANS FOR INFLATING RUBBER TIRES.
APPLICATION FILED OCT. 10, 1905.
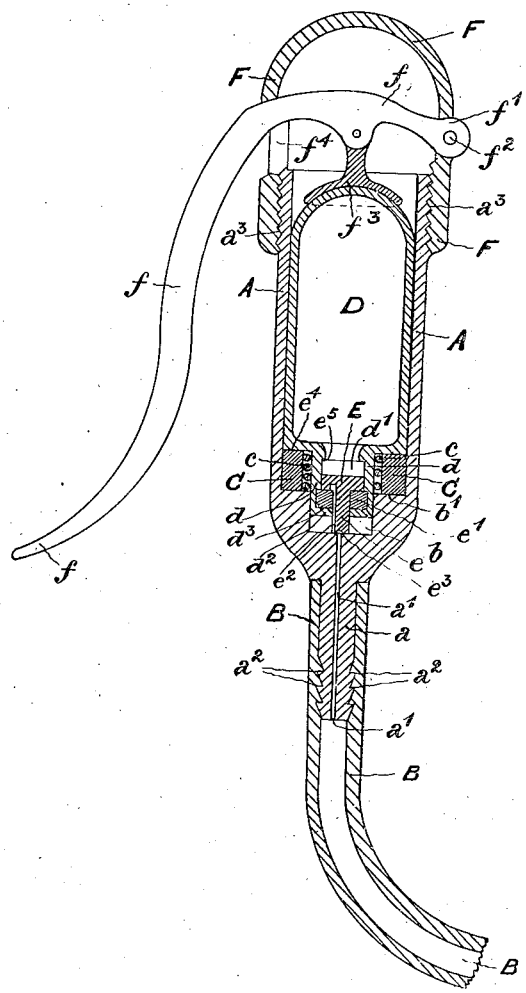

UNITED STATES PATENT OFFICE.

ALFONSO GEORGE LAVERTINE AND JAMES EDWARD McNELLAN, OF JOHANNESBURG, TRANSVAAL.

MEANS FOR INFLATING RUBBER TIRES.

No. 827,926. Specification of Letters Patent. Patented Aug. 7, 1906.

Application filed October 10, 1905. Serial No. 282,109.

*To all whom it may concern:*

Be it known that we, ALFONSO GEORGE LAVERTINE and JAMES EDWARD MCNELLAN, subjects of the King of Great Britain, residing at Johannesburg, Transvaal, have invented certain new and useful Improvements in Means for Inflating Rubber Tires, of which the following is a specification.

This invention relates to a device applicable for inflating the rubber or other similar tires of bicycles, tricycles, motor-cars, or other descriptions of vehicles fitted with pneumatic or inflatable tires.

It has reference to that kind of apparatus in which a cartridge containing air or gas under pressure is employed, which air or gas is released and conducted to the tire to be inflated.

The object of the present improvements is to simplify the construction of the device and render it more efficient in operation and convenient in use.

By the present improvements the air or gas is permitted to escape from or pass out of the cartridge directly to the tire, and only so much of the air or gas is permitted to escape from the cartridge as is necessary to inflate the tire, the remainder being retained for future use inside the cartridge. By this means the possibility of leakage is minimized. Further, the cartridge is not destroyed by the operation of releasing the air or gas, so that it may, if desired, be refilled from time to time.

The invention will now be described in detail by aid of the accompanying drawing, representing the device in sectional elevation.

In the drawing, A designates a cylindrical or other suitably-shaped casing, which casing at one extremity is shaped to form the tubular extension $a$. Through the extension $a$ is formed a hole $a'$, communicating at the one end with the interior of the cylinder or casing A and at the other end opening to the exterior. The extension $a$ is constructed with a plurality of annular projections $a^2$, forming shoulders or abutments which serve to retain in position thereon the rubber or other flexible tube B, which serves for conducting the air or gas to the tire to be inflated. This flexible tube or pipe B is preferably fitted with a union for connecting it to the valve ordinarily provided on pneumatic or like inflatable tires. Inside the casing A at the bottom is formed a cylindrical recess $b$, with which the port or passage $a'$ communicates. Arranged on the annular projection or shoulder $b'$, formed round the top of the recess $b$, is a ring or washer C of rubber or other suitable resilient material, and inside said ring or washer C and resting on the annular projection $b'$ is a spiral metal spring $c$. Inside the cylindrical casing A is placed the cartridge or holder D for the compressed air or gas. It is shaped externally to fit said casing—that is to say, if the casing is made cylindrical internally the cartridge is also made cylindrical for the greater portion of its length. At one end it is reduced or constructed with a neck $d$. In the neck $d$ is constructed a recess $d'$, which communicates with the interior of the cartridge D. In this recess $d'$ is located the valve E. The valve E is constructed with a stem $e$, which projects beyond the end of the cartridge, and arranged round the stem $e$ inside the neck $d$ of the cartridge is a packing-ring or washer $e'$ of rubber or other suitable material. The end of the cartridge D is turned over in the form of a rim or flange $d^2$ to retain the packing-ring or washer $e'$ in the recess $d^3$ and at the same time to serve as a guide for the valve-stem $e$. In the stem $e$ of the valve is formed a longitudinal groove $e^2$, and across the outer end of the stem $e$ is formed a transverse groove $e^3$. The valve E is held on its seat on the rubber ring or washer $e'$ by the pressure of the compressed air or gas. The other end of the cylindrical casing A is constructed with an external screw-thread $a^3$, and over it is screwed a cap or cover F. In the cap or cover F is arranged a lever $f$, which is pivoted at one extremity $f'$ on a pin $f^2$, fixed to the cap F. To the lever $f$ inside the cap or cover F is pivoted a concave piece $f^3$, which is shaped to fit over the end of the cartridge D. The lever $f$ projects through a slot $f^4$, formed in the cap F opposite the pin or pivot $f^2$, and is shaped to render it capable of being easily moved to force the cartridge D forward inside the casing A to release the air or gas.

In using the appliance the cap F is screwed off the end of the cylindrical casing A and the cartridge D placed in position inside the casing A with the neck $d$ projecting down into the recess $b$ in the bottom of the casing A and with the annular shoulder $e^4$ abutting the spiral spring $c$ and the rubber or other resilient ring C. When in this position, the outer end of the stem $e$ of the valve E is resting upon or in close proximity to the bottom of the recess $b$ and the transverse groove $e^3$ over the inner end of the hole or port $a'$ in the extension $a$. The cap F is now screwed over the end of the cylindrical casing A until the concave piece $f^3$ engages the end of the cartridge D and the lever $f$ takes up a position in the outer end of the slot $f^4$ in the cap or cover F. The cap F is screwed down sufficiently far to cause the cartridge to be brought to its seating on the resilient ring or washer C. The parts may be kept in these positions until it is desired to bring the appliance into use, whereupon the depression of the lever $f$ forces the concave piece $f^3$ against the end of the cartridge D and depresses the cartridge against the rubber ring or washer C and spiral metal spring $c$ and by causing the outer end of the valve-stem $e$ to come into contact with the bottom of the recess $b$ forces the valve E off its seat on the rubber or other resilient ring $e'$ and allows the air to pass from the cartridge D and recess $d'$ round the valve E to the groove $e^2$ and from the latter into the bottom of the recess $b$, whence it passes by the transverse groove $e^3$ to the port or passage $a'$, formed through the extension $a$, to the pipe or tube B, along which it is conducted to the valve of the tire to be inflated. The depression of the cartridge D compresses the rubber ring C against the internal walls of the casing A and against the shoulder $e^4$, formed round the neck of the cartridge, and so prevents any of the compressed air or gas escaping from the recess $b$ between the cartridge D and casing A. The movement of the cartridge D over the valve E is limited by the annular projection or shoulder $e^5$, forming the inner end of the recess $d'$; but it is only necessary for the cartridge D to move a short distance, so that the valve E leaves its seat on the rubber ring $e'$, to permit the air or gas to pass from the cartridge D through the valve E to the tire. When the tire has been inflated, by releasing the lever $f$ the spiral ring $c$, aided by the resilient ring or washer C, forces the cartridge D upward into its normal position against the concave piece $f^3$, and the pressure of the air or gas inside the cartridge keeps the valve E on its seat on the rubber or other resilient ring or washer $e'$, and so prevents the escape of any of the air or gas when the lever has been released.

What we claim as our invention, and desire to protect by Letters Patent, is—

1. In means for inflating tires, a cartridge for holding compressed air or gas, said cartridge being constructed to provide a valve-chamber and with an annular projection at the bottom of said chamber, a valve located in said chamber for which valve the projection forms a stop, an annular recess in the valve-chamber and a resilient ring or washer in said recess on which the valve is seated, substantially as described.

2. In means for inflating tires, in combination, a cartridge containing compressed air or gas and constructed to provide a valve-chamber at one end thereof and with an annular projection at the bottom of said chamber to form a stop for the valve, a valve located in said chamber constructed with a stem extending through the cartridge, a groove in said stem and a resilient packing-ring or washer in the cartridge which serves as a seating for the valve, substantially as described.

3. In means for inflating tires, in combination, a casing having a chamber in the inner end thereof, a resilient ring in said casing round said chamber, a cartridge containing compressed air or gas formed with a neck which projects into the chamber in the bottom of the casing, said cartridge being constructed with a chamber in the neck portion, a valve located in said chamber and a resilient packing-ring on which said valve is seated, the valve being constructed with a stem which projects beyond the end of the cartridge and is adapted to engage the bottom of the chamber in the casing to prevent movement of the valve when the cartridge is pressed into the casing, and means for pressing the cartridge into the casing and over the valve to release the air or gas, substantially as described.

4. In means for inflating tires, in combination, a casing constructed with a recess in the inner end thereof and with a passage communicating with said recess, means for conducting the air or gas from said passage to the tire to be inflated, a resilient ring in the casing round the recess, a cartridge containing compressed air or gas constructed with a neck or shoulder which is seated on the resilient ring when the cartridge is placed in the casing, said cartridge having formed in the neck a valve-chamber and an annular projection at the bottom of said chamber, a valve and a resilient ring in said chamber, said ring forming a seating for the valve, the valve being constructed with a stem in which is formed a groove along which the compressed air or gas may escape to the recess in the casing, and means for forcing the cartridge into the casing to open the valve, substantially as described.

5. In means for inflating tires, in combination, a casing, a cartridge located in said casing, a valve fitted in said cartridge which is kept closed by the internal pressure of the compressed air or gas, means for preventing the escape of the air or gas between the cartridge and casing, means for conducting the compressed air or gas from the casing to the tire to be inflated, and means for holding the valve while permitting the cartridge to be pressed over it to release the air or gas from the cartridge, substantially as described.

6. In means for inflating tires, in combination, a casing constructed with an extension through which a hole is formed to provide an outlet for the air or gas, a recess in the inner end of said casing, a flexible tube for conducting the air or gas from the extension to the tire to be inflated, a resilient ring located in the casing round the recess and a spiral spring located in said resilient ring, a removable and renewable cartridge containing air or gas under pressure, said cartridge being constructed with an annular shoulder seated upon the resilient ring and spiral spring and with a valve-chamber and annular projection, an annular projection forming a stop, a valve located in said chamber and a resilient ring which forms a seating for the valve and upon which it is forced by the pressure of the air or gas in the cartridge, a cap or cover screwed over the end of the casing, a lever pivoted in said cap and a piece pivoted to said lever which engages the end of the cartridge and serves for depressing it in the casing to force it over the valve when the stem of the valve engages the bottom of the recess in the casing to allow the compressed air or gas to escape from the cartridge to said recess, substantially as described.

In witness whereof we have hereunto set our hands in the presence of two subscribing witnesses.

ALFONSO GEORGE LAVERTINE.
JAMES EDWARD McNELLAN.

Witnesses:
CHAS. OVENDALE,
R. OVENDALE.